United States Patent [19]

Barner

[11] Patent Number: 4,740,865
[45] Date of Patent: Apr. 26, 1988

[54] EXTRUDED THREE-PHASE BASE PAN CONFIGURATION FOR A LOAD CENTER

[75] Inventor: Gregory P. Barner, Atlanta, Ga.

[73] Assignee: Siemens Energy & Automation, Inc., Atlanta, Ga.

[21] Appl. No.: 925,996

[22] Filed: Oct. 31, 1986

[51] Int. Cl.<sup>4</sup> ............................................. H02B 1/04
[52] U.S. Cl. .................................... 361/346; 361/355; 361/379; 361/383
[58] Field of Search .................. 339/198 N; 361/346, 361/353, 355, 358, 361, 363, 379, 376, 383

[56] References Cited

U.S. PATENT DOCUMENTS

| | | | |
|---|---|---|---|
| 2,738,445 | 3/1956 | Hammerly et al. | 317/119 |
| 2,905,796 | 9/1959 | Fleming | 260/168 |
| 2,986,676 | 3/1960 | Edmunds | 317/119 |
| 3,243,663 | 3/1966 | Rowe | 317/119 |
| 3,309,580 | 3/1967 | Jacobs et al. | 317/119 |
| 3,375,411 | 3/1968 | Mrowka | 317/119 |
| 3,404,315 | 10/1968 | Jacobs et al. | 317/119 |
| 3,411,042 | 11/1968 | Klein | 317/119 |
| 3,588,620 | 6/1971 | Wasileski | 317/119 |
| 3,858,092 | 12/1974 | Olashaw et al. | 361/346 |
| 4,142,225 | 2/1979 | Diersing et al. | 361/358 |
| 4,153,318 | 5/1979 | Bishop et al. | 339/22 B |
| 4,251,851 | 2/1981 | Diersing et al. | 361/363 |
| 4,301,493 | 11/1981 | Schweikle et al. | 361/355 |
| 4,449,296 | 5/1984 | Luke et al. | 29/883 |
| 4,536,823 | 8/1985 | Ingram et al. | 361/355 |

Primary Examiner—M. H. Paschall
Assistant Examiner—Gregory D. Thompson
Attorney, Agent, or Firm—James G. Morrow

[57] ABSTRACT

An extruded three-phase base pan for a load center has a central rail with a cross-sectional configuration in the form of a modified cross. The upper surface of each arm of the cross curves upward and away from the body of the cross. The bottom surface and top surface of each arm are joined by a U-shaped surface. The bottom of the base pan has ribs with integrally formed grooves.

5 Claims, 2 Drawing Sheets

EXTRUDED THREE-PHASE BASE PAN CONFIGURATION FOR A LOAD CENTER

CROSS-REFERENCE TO RELATED APPLICATIONS

This application is related to co-filed application Ser. No. 926,008 "Three-Phase Load Center", by Gregory P. Barner and Drew S. Hancock, which is incorporated herein by reference.

BACKGROUND OF THE INVENTION

This invention relates generally to three-phase load centers and more particularly to a three-phase extruded base pan configuration for such a load center.

One-piece base pan configurations extruded from thermally conductive and electrically insulative material have come into being because they are simple to manufacture, easy to use, minimize parts and reduce expenses associated with the manufacture of load centers. One advantage of an extruded base pan configuration is that is offers the potential for saving space. Space is important in many residential and light industrial applications where there is only the thickness of a wall stud within which to place a load center. Obviously, the thinner the load center is, the more desirable it is for use in these limited space environments. The base pan itself can be a limiting factor where space is a requirement, because some base pans, for example those constructed of metal components, require many parts which are held together with bolts or screws making them bulky. In addition to being bulky on their own, the metal base pans require insulators to insulate the metal conductive base pan components from the live bus bars. This further adds to the weight, complexity and size of the load center. It will be appreciated that it would be highly desirable to have a base pan constructed of insulative material which can be extruded in a simple, compact fashion to minimize the dimensions of the load center.

As the physical dimensions of load centers decrease, heat dissipation becomes a problem because the load center must meet certain operating conditions which restrict the temperature of the bus bars under load. In the old-fashioned metal base pan load centers, the components were spaced apart so that there was adequate ventilation, or the bus bars were made with sufficient cross-sectional area that the temperature rise in them was not a serious problem. However, when one goes to extruded insulative base pans to save space, then the size of the bus bars proportionately shrinks to maintain the neat, compact appearance. With the shrinking of the bus bars, heat dissipation becomes a problem. Accordingly, it will be appreciated that it would be highly desirable to have an extruded base pan which utilizes small cross-sectional area bus bars but provides adequate cooling so that the temperature rise in the bus bars is not excessive.

Accordingly, it is an object of the present invention to provide an extruded bas pan formed of electrically insulative material.

Another object of the invention is to provide an extruded base pan which provides adequate ventilation to maintain a low operating temperature for the bus bars.

SUMMARY OF THE INVENTION

Briefly stated, in accordance with one aspect of the invention, the foregoing objects are achieved by providing a three-phase base pan for a load center. The base pan has a centrally disposed rail with a cross-sectional configuration in the form of a modified cross. Each arm of the cross has a curved upper surface and a lower surface. A first pair of channels extends the length of the base pan with each channel disposed in parallel relationship on either side of the rail. A pair of outwardly extending double hook formations are disposed along the base pan parallel to the rail and channels. A second pair of channels extend the length of the base pan with each channel disposed parallel to the rail along on the outer edge of the base pan.

DESCRIPTION OF THE DRAWINGS

While the specification concludes with claims particularly pointing out and distinctly claiming the subject matter which is regarded as the invention, it is believed that the invention will be better understood from the following description of the preferred embodiment, taken in conjunction with the accompanying drawings in which:

DESCRIPTION OF THE PREFERRED EMBODIMENT

Figure 1:
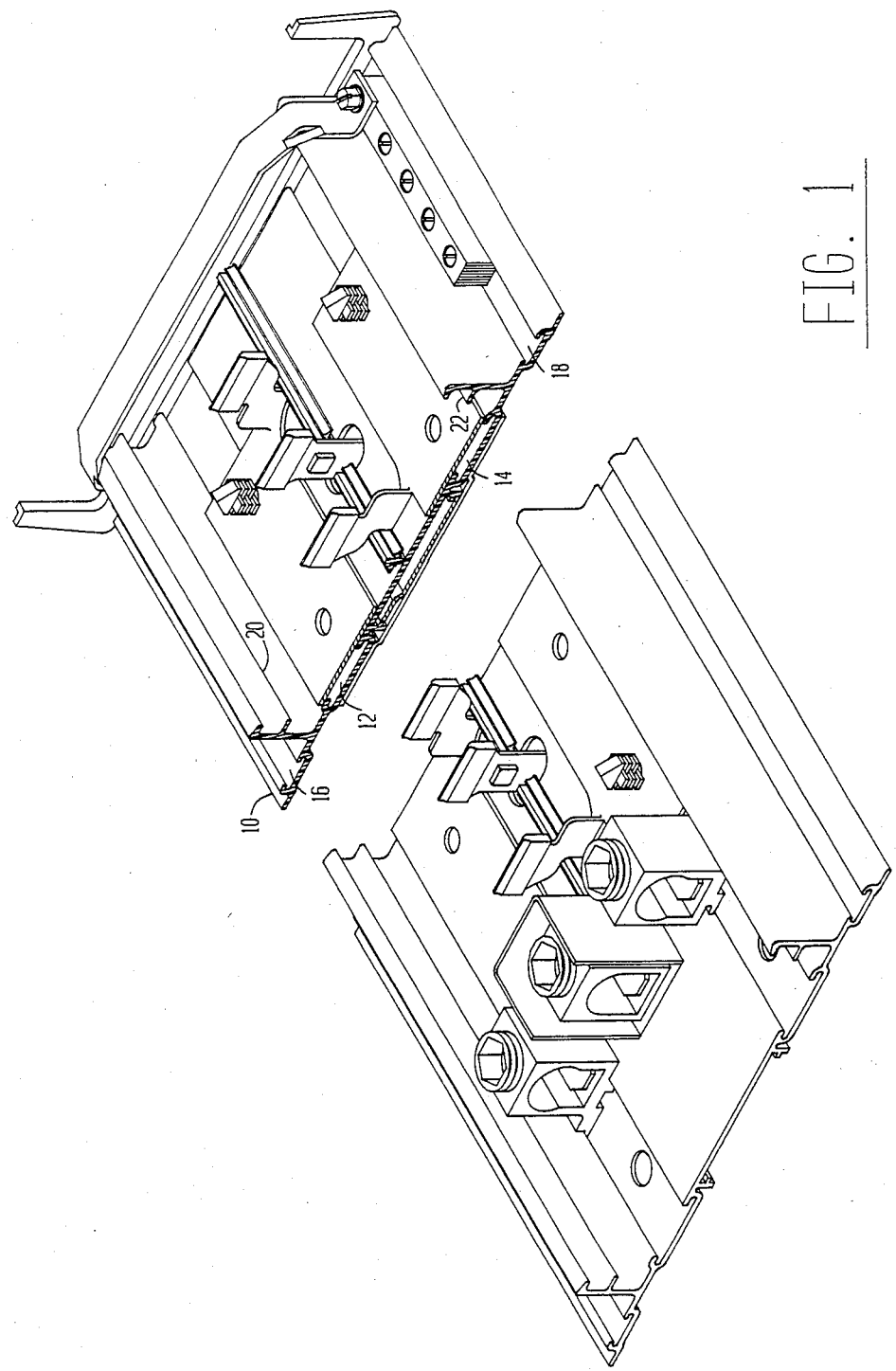
FIG. 1 is an isometric view of a three-phase load center with the metal enclosure removed and with a section removed revealing the cross-section of the base pan.
Figure 2:
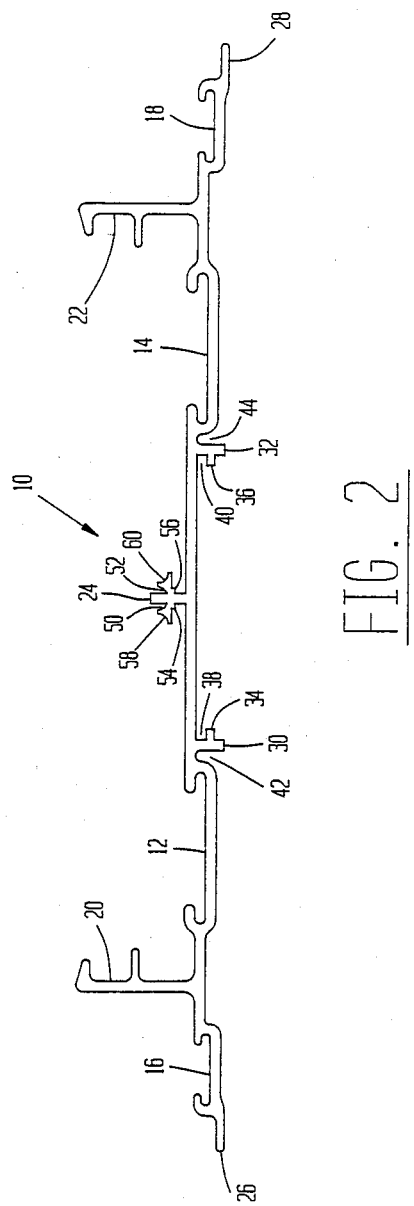
FIG. 2 is a somewhat enlarged cross-sectional view of an extruded base pan configuration formed of insulative material.

Referring to FIGS. 1 and 2, an extruded base pan is formed of electrically insulative material which is also preferably a heat conductive material as is known in the art. The base pan 10 has a top surface and a bottom surface. The top surface has first and second spaced apart U-shaped channels 12, 14 formed therein which are useful for engaging entrance connectors and for forming air passageways which assist in cooling the components of the load center, particularly the A and C phase bus bars. The top surface also has formed thereon U-shaped channels 16 and 18 which are useful for engaging the neutral bars of a load center, particularly those with split neutral. The base pan also has rails with double hook formations 20, 22 for engaging circuit breakers. The channels 12, 14, 16, 18 and the hooks 20, 22 extend longitudinally along the length of the base pan.

The base pan 10 also has a central rail 24 which extends along the length of the base pan and has a cross-sectional configuration in the form of a modified cross. Each arm of the cross 24 has an upper curved surface 50, 52 which curves upward and away from the body of the cross. Each arm of the cross has a lower surface 54, 56 which extends at a right angle from the body of the cross a short distance and which bends at approximately a 90° angle upward and then extends horizontally again away from the body of the cross. The upper surface of each arm and the bottom surface of each arm are joined by a U-shaped surface 58, 60. This shape is advantageous for engaging circuit breakers and spacers.

The bottom surface of the base pan includes outer ribs 26, 28 adjacent the edges of the base pan and located at a lower elevation than the other components of the bottom surface of the base pan. This creates a longitudinally extending groove between the ribs 26 and 28 which is useful for ventilation purposes. The bottom surface also contains longitudinally extending ribs 30, 32 which extend the length of the base pan. Each rib contains a protrusion or lip 34, 36 located on the rib toward the center of the base pan. Each lip extends at approximately a 90° angle from the rib and the lips 34, 36 face each other. A groove 38, 40 is located adjacent each lip and extends the length of the base pan. Each groove 38, 40 is positioned between a respective protrusion and the bottom surface of the base pan. These grooves 38, 40 help form a ventilation passageway between the bottom of the base pan and the top surface of the B-phase bus bar.

When assembled, the B-phase bus bar will rest beneath the lips 34 and 36 or will rest adjacent the lips 34 and 36. In either configuration, there will be a ventilation passageway extending between the grooves, the bottom of the base pan and the top of the B-phase insulator. Longitudinal grooves 42, 44 are also located on the outboard side of the ribs 30, 32. These grooves provide additional ventilation passageways.

In operation, the extruded base pan is used in a three-phase load center wherein the A and C phases rest atop the U-shaped channels 12 and 14 forming ventilation passageways between the bottom of the bus bars and the bottom of the channels. The B-phase bus bar is located beneath the bottom surface of the base pan between the ribs 30 and 32 forming a ventilation passageway between the bottom surface of the base pan, the top surface of the bus bar and grooves 38 and 40. The surface of the B-phase bus bar is also at an elevation lower than the outboard grooves 42, 44 so that these grooves also act as ventilation passageways.

It will now be understood that there has been presented an extruded base pan configuration which is a one-piece construction which is easy to manufacture and which provides ventilation passageways to control the temperature of the bus bars. The base pan includes a centrally disposed rail which has a cross-sectional configuration in the form of a modified cross with each arm of the cross having a curved upper surface and a lower surface. The modified cross has a body and the upper surface of each arm curves upward and away from the body. The lower surface of each arm extends at a right angle from the body a short distance and then angles upward at a right angle and then continues horizontally away from the body. The upper and lower surfaces of each arm are joined by a U-shaped surface.

A first pair of channels extend the length of the base pan with each channel disposed in parallel relationship on either side of the central rail for slidably receiving a pair of main-line lugs. A second pair of channels extend the length of the base pan with each channel disposed parallel to the central rail along the outer edge of the base pan for slidably receiving neutral elements thereon. The outwardly extending double hook formations are each disposed along the base pan parallel to the central rail and first pair of channels for mounting the neutral end of a circuit breaker.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent is:

1. A three-phase base pan for a load center, comprising:
    a bottom surface including longitudinally extending ribs, each rib containing a lip extending at substantially a right angle from each rib forming a groove between the bottom surface and the lip;
    a centrally disposed rail;
    a first pair of channels extending the length of the base pan, each channel being positioned in a parallel relationship on either side of the rail, each channel cooperating with one rib to form a groove therebetween;
    a pair of outwardly extending double hook formations, each formation being disposed along the base pan generally parallel to the rail and the first pair of channels; and
    a second pair of channels extending the length of the base pan, each channel being disposed parallel to the rail along an outer edge of the base pan.

2. A base pan according to claim 1, the centrally disposed rail having a cross-sectional configuration in the form of a modified cross having a central body and two arms, with each arm of the cross having an upper surface curving away from the body and a lower surface, the lower surface of each arm extending at a right angle horizontally from the body a short distance, then bending upward at approximately a right angle and then continuing to extend horizontally away from the body.

3. A base pan according to claim 2, wherein the upper surface and lower surface of each arm are joined by a U-shaped surface.

4. A base pan according to claim 1, wherein each groove located between the bottom surface and the associated lip is open toward the center of the base pan.

5. A base pan according to claim 1, wherein each lip extends the length of each rib.

* * * * *